United States Patent [19]
Westerlage et al.

[11] Patent Number: 6,141,404
[45] Date of Patent: Oct. 31, 2000

[54] VOICE AND DATA COMMUNICATION

[75] Inventors: Kenneth R. Westerlage, Fort Worth; David H. Bagley, Lewisville; Thomas D. Russell, Plano, all of Tex.

[73] Assignee: @Track Communications, Inc., Richardson, Tex.

[21] Appl. No.: 08/665,196

[22] Filed: Jun. 13, 1996

[51] Int. Cl.[7] .................................................. H04M 15/00
[52] U.S. Cl. ........................ 379/118; 379/112; 379/114; 379/100.09; 358/407
[58] Field of Search ..................................... 379/112, 114, 379/115, 100.09, 100.01; 370/428–429, 425–426; 358/407

[56] References Cited

U.S. PATENT DOCUMENTS

| | | | |
|---|---|---|---|
| 5,018,191 | 5/1991 | Catron et al. | 379/207 |
| 5,222,120 | 6/1993 | McLeod et al. | 379/88 |
| 5,291,302 | 3/1994 | Gordon et al. | 358/407 |
| 5,404,231 | 4/1995 | Bloomfield | 358/407 |
| 5,631,904 | 5/1997 | Fitser et al. | 379/127 |
| 5,646,987 | 7/1997 | Gerber et al. | 379/265 |
| 5,661,787 | 8/1997 | Pocock | 379/67 |
| 5,761,415 | 6/1998 | Joseph et al. | 395/200.3 |
| 5,844,973 | 12/1998 | Venkatraman et al. | 379/127 |

*Primary Examiner*—Duc Nguyen
*Attorney, Agent, or Firm*—Baker Botts L.L.P.

[57] ABSTRACT

A communication system (10) includes mobile units (12a–12f), hosts (14a–14d), and remotes (22a–22b). The mobile units (12a–12f), hosts (14a–14d), and remotes (22a–22b) communicate data and voice using a complex (16). The complex (16) includes interfaces (52, 54, 56) and a switch (50) to communicate data and voice in the communication system (10). A routing module (70) accesses a profile database (26) to provide a routing function to the users of communication system (10). A CDR generation module (72), a CDR database (28), and a billing system (30) provide a billing function to the users of communication system (10).

42 Claims, 5 Drawing Sheets

| | ID | BILLING ID | DATA ASSOCIATION | TEMPORARY DATA ASSOCIATION | CONNECTION INFORMATION | AVAILABILITY |
|---|---|---|---|---|---|---|
| HOST 14a | 101 | 01 | 001,002 | | WAN NODE | 1700-1900/MThFS |
| HOST 14b | 102 | 02 | 001,005 | | HOST@TRUCK.COM | Y |
| HOST 14c | 103 | 03 | 002,006 | 101,006 | (817)555-1212 | N |
| HOST 14d | 104 | 04 | 003,004,101 | | LAN NODE | Y |
| MU 12a | 001 | 01 | 101 | | UIN#1 | 0800-0900/MTW |
| MU 12b | 002 | 02 | 101,102 | | UIN#2 | Y |
| MU 12c | 003 | 06 | 101,103 | | (099)755-1234 | N |
| MU 12d | 004 | 07 | 001,002,104 | | UIN#3 | N |
| MU 12e | 005 | 02 | 102,103 | 001,104 | (099)755-4321 | Y |
| MU 12f | 006 | 03 | 101,102,103,104 | | 206.42.4.69 | Y |
| R 22a | 201 | CREDIT CARD # | — — | | (617)555-1212 | 0100-0200 |
| R 22b | 202 | 09 | — — | | (213)555-1212 | Y |

FIG. 4

| ORIGINATOR | RECIPIENT(S) | DATA | PRIORITY | TIMESTAMP |
|---|---|---|---|---|
| 101 | 001,002 | A.DAT | U | 01/01/96 01:00 |
| 101 | 006 | B.DAT | N | 01/01/96 02:00 |
| 104 | 001,003,004,005 | C.DAT | N | 01/01/96 02:30 |
| 003 | 101,103 | D.DAT | N | 01/01/96 03:15 |
| 005 | 001,104 | E.DAT | U,L | 01/01/96 04:20 |
| 004 | 104 | F.DAT | L | 01/01/96 04:25 |
| 001 | 101,102 | G.DAT | L | 01/01/96 05:05 |
| ... | ... | ... | ... | ... |

VOICE AND DATA COMMUNICATION

TECHNICAL FIELD OF THE INVENTION

This invention relates in general to communication systems, and more particularly to voice and data communication.

BACKGROUND OF THE INVENTION

A communication system includes an originator and a recipient of information. For example, the originator in a telephone network places a call to the recipient to initiate voice communication. The originator may also establish communication with a recipient to send data. The communication system typically includes one or more components disposed between the originator and recipient to accomplish the voice and data communication.

As communication systems become larger and more complex, originators and recipients of information demand greater functionality. Current systems for point-to-point routing of information may be inappropriate in communication applications that involve multiple groupings or associations between originators and recipients. For example, a communication system adapted for the trucking industry should provide flexible routing to meet a number of different operating environments involving trucking companies, tractor and trailer manufacturers, dispatchers, independent owners and operators, brokers, customers, or others. These different operating environments also demand close integration between voice and data communication.

In a typical landline telephone network, billing data for each communication is captured to generate a single call detail record for billing a single party. A cellular telephone provider may bill both incoming and outgoing calls to the user's cellular telephone. These billing practices may also be inappropriate in a communication applications that involve multiple groupings or associations between originators and recipients of voice and data.

SUMMARY OF THE INVENTION

In accordance with the present invention, the disadvantages and problems associated with communication systems have been substantially reduced or eliminated. In particular, a communication system and method is disclosed that provides flexible routing and billing functions to originators and recipients of voice and data.

In accordance with one embodiment of the present invention, a method for communicating includes the following steps performed at a complex: receiving data from an originator; retrieving a recipient identifier associated with the originator; storing data for delivery to a recipient indicated by the recipient identifier; and generating a call detail record having a billable time relating to the time to receive the data from the originator and a billing identifier associated with the originator.

In accordance with another aspect of the present invention, a method for generating a call detail record comprises: establishing a call between a user and a complex; communicating data between the user and the complex during a data segment of the call; storing information in the call detail record relating to the data segment; providing voice communication to the user through the complex during a voice segment of the call; and storing information in the call detail record relating to the voice segment.

Important technical advantages of the present invention include a communication system that provides flexible routing of data between originators and recipients. In a particular embodiment, a number of mobile units and a number of hosts may be the originators or recipients of data. With particular application to the trucking industry, the mobile unit equipped with a cellular telephone may be associated with a truck tractor or trailer, and a host may be associated with a dispatcher, broker, or trucking customer. A complex couples the mobile units to the hosts and provides flexible routing of data using a data association. The data association specifies an originator, one or more recipients, and connection information to establish communication with the recipients. The data association provides default routing based on the originator, but may be temporarily modified to provide an addressing function. In a particular embodiment, the complex receives and stores data from an originator, and later forwards this data to the appropriate recipients. The time for forwarding data to recipients may depend on the availability of the recipients, the delivery priority of the data, and a timestamp indicating when the data was received at the complex.

Another important technical advantage of the present invention includes a complex that provides flexible billing of voice and data communication between originators and recipients. The complex generates a call detail record (CDR) corresponding to multiple segments of a single call transaction. The segments can be data segments or voice segments. For example, a call between the complex and a remote may include one or more data segments followed by a voice segment. Each segment of the call can be represented by billing information stored in the CDR. The billing information includes a billable time, a billing identifier, and any other suitable billing information. The complex maintains a billing identifier for each potential data originator or voice originator. Multiple segmented CDRs provide the complex greater flexibility in apportioning the cost of voice and data communication to multiple billing identifiers. Other important technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description taken in conjunction with the accompanying drawings, in which.

DETAILED DESCRIPTION OF THE INVENTION

Figure 1:
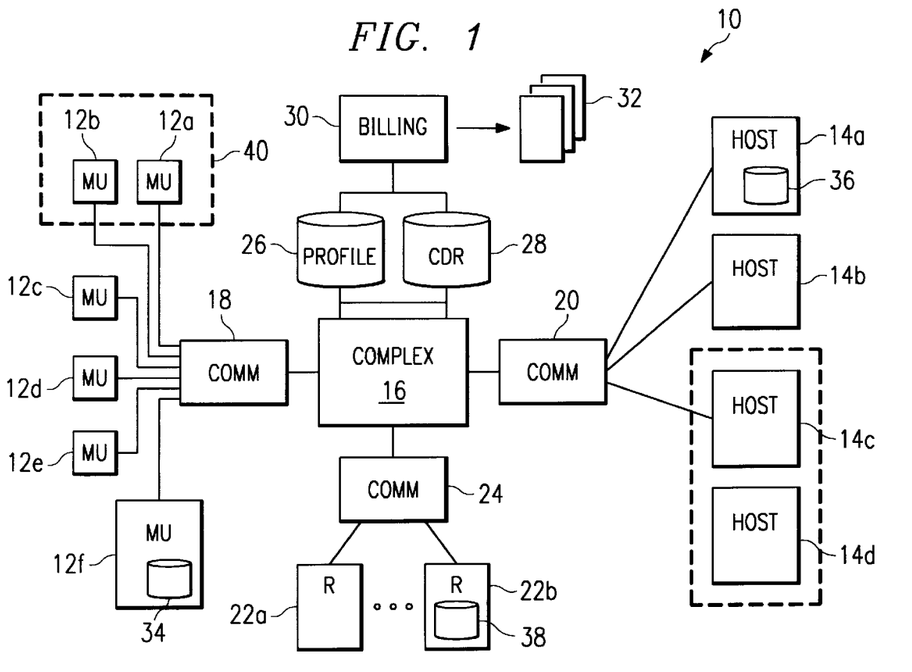
FIG. 1 illustrates a communication system that includes mobile units, hosts, remotes, and a complex.

FIG. 1 illustrates a communication system 10 that provides both voice and data service to a plurality of mobile units 12a–12f, a plurality of hosts 14a–14d, and a plurality of remotes 22a–22b. Mobile units 12a–12f are referred to generally as mobile unit 12; hosts 14a–14d are referred to generally as host 14; and remotes 22a–22b are referred to generally as remote 22. Mobile unit 12, host 14, and remote 22 are collectively referred to as users of communication system 10. A complex 16 provides routing and billing functions to users of communication system 10.

Communication facilities 18, 20, and 24 couple mobile units 12, hosts 14, and remotes 22, respectively, to complex 16. Communication facilities 18, 20, and 24 may include one or more components of a landline telephone network, a cellular telephone network, a microwave communication network, a personal communication system (PCS), a specialized mobile radio (SMR) system, an enhanced specialized mobile radio (ESMR) system, a satellite communication network, a one-way or two-way paging system, a local area network (LAN), a wide area network (WAN), or any other appropriate wireless or wireline communication facility. In one particular embodiment, communication facility 18 includes components of a mobile communication network, such as a cellular telephone network, and communication facilities 20 and 24 include components of a fixed communication network, such as a landline telephone network.

A profile database 26 and a call detail record (CDR) database 28 are coupled to complex 16. A billing system 30 accesses information in profile database 26 and CDR database 28 to generate bills 32 for users of communication system 10. Bills 32 may represent direct billing using, for example, mailed invoices, credit card billing, or debit billing from an account maintained by billing system 30.

Profile database 26 maintains profile information for users of communication system 10. Mobile unit 12, host 14, and remote 22 may store locally all or selected portions of profile information from profile database 26, as illustrated by database 34 associated with mobile unit 12f, database 36 associated with host 14a, and database 38 associated with remote 22b.

In one embodiment, communication system 10 is particularly adapted to the trucking industry. Truck tractors or trailers are equipped with mobile units 12 and trucking companies, tractor/trailer manufacturers, dispatchers, brokers, customers, or others desiring communication with mobile units 12 operate hosts 14. Mobile units 12 may also be installed on barges, cabs, cars, recreational vehicles, plane cargo containers, persons, or any other mobile item. Two or more mobile units 12a and 12b may be associated as indicated by dashed line 40. For example, mobile unit 12a may be installed on a truck tractor and mobile unit 12b may be installed on a truck trailer. The present invention contemplates any number and arrangement of mobile units 12 to be installed on or associated with mobile items.

In addition to trucking companies or dispatchers, hosts 14 may be operated by tractor/trailer manufacturers to offer enhanced maintenance services to vehicles equipped with mobile units 12. Hosts 14 may also represent load brokering services that provide coordination between individual truckers or trucking companies and the loads for transportation. Specific customers or trailer owners may operate hosts 14 to communicate with and monitor the truckers they hire. The present invention contemplates any number and arrangement of hosts 14 that provide functions for communicating with and monitoring mobile units 12.

One important technical advantage of communication system 10 is the routing function performed by complex 16. The routing may be of voice or data communication using direct routing or a store-and-forward technique. For voice communication, complex 16 maintains connection information, provides call delivery functions, and couples voice calls between users of communication system 10. The voice call processing techniques of complex 16 are described in U.S. patent application Ser. No. 08/175,256 entitled "Data Messaging in a Communications Network", which is hereby incorporated by reference. For data communication, complex 16 receives data from a data originator, such as mobile unit 12, host 14, or remote 22. Complex 16 accesses profile database 26 to retrieve a data association for the data originator. Complex 16, either immediately or after storing the data, sends the data to one or more recipients specified in the data association.

Another important technical advantage of communication system 10 is the billing function performed by complex 16. Each of the mobile units 12, hosts 14, and remotes 22 may have an associated billing identifier that allows complex 16 to bill the appropriate party for voice or data communication. The billing identifier may be associated with the owner, user, or other party responsible for communication charges incurred by a user of communication system 10. Complex 16 monitors a call transaction with a user or between users in communication system 10. Each call transaction may include one or more data segments or voice segments. Each data segment is associated with a data originator and each voice segment is associated with a voice originator. Complex 16 generates a call detail record (CDR) for each call transaction, which may include billing information for multiple data segments and voice segments. Complex 16 stores the multiple segmented CDR in CDR database 28 for access by billing system 30 for generation of bills 32.

The billing function of complex 16 is particularly adapted to the different operating environments of a trucking system. The simplest operating environment relates one or more mobile units 12 to a single host 14. A trucking company, dispatcher, tractor/trailer manufacturer, or other entity operates host 14 to maintain communication and control over multiple mobile units 12. In this environment, complex 16 bills host 14 for all voice and data communication involving associated mobile units 12.

A second operating environment utilizes a single host 14 that supports multiple billing identifiers. This may be important if a trucking company operating host 14 has two or more subsidiary companies utilizing the same host facility. For example, complex 16 bills communications involving mobile units 12a–12c to a first subsidiary company and communications involving mobile units 12d–12f to a second subsidiary company, while both companies operate the same host 14. The second operating environment also supports billing mobile units 12 for their individual usage. In one example, complex 16 bills mobile unit 12 for any data or voice communication originating at mobile unit 12. Any data or voice communication to mobile unit 12 would be billed to its associated host 14. This simple algorithm supported by complex 16 always bills the originator of the voice or data communication.

Another operating environment supported by complex 16 may have more than one physical hosts 14c and 14d that generate a single bill invoice. This represents a trucking company that has more than one location from which it can dispatch its tractors or trailers. In this environment, complex 16 generates a single bill for trucking company for communications involving hosts 14c and 14d. In one embodiment, the bill may be itemized to reflect charges attributable to hosts 14c and 14d.

Still another operating environment supports multiple hosts 14 generating multiple bill invoices. This environment demonstrates the full billing functionality of complex 16 and, in a particular embodiment, represents the service requirements of the owner/operator and broker. In this embodiment, complex 16 maintains a billing identifier for each user in communication system 10. These billing identifiers allow complex 16 and billing system 30 to generate bills 32 that reflect any grouping or association of mobile units 12, hosts 14, and remotes 22. The billing identifiers and appropriate billing rules provide complex 16 the flexibility to apportion costs for voice and data communication in communication system 10.

As discussed above, the one billing rule assesses charges to the voice or data originator. Another exemplary billing technique implemented by complex 16 may be summarized in the following billing rules: a) voice communication is billed to the billing identifier of the call originator; b) data communication between hosts 14 and complex 16 are billed to the billing identifier of hosts 14; c) inbound data communication to mobile units 12 are billed to the billing identifier of the data originator; d) outbound data communication from mobile units 12 are billed to the billing identifier of mobile units 12. The billable time for any voice or data communication may be rounded or truncated to the nearest minute or fraction of a minute. In a particular embodiment, data sent by mobile unit 12 in response to an immediate data request from host 14 is billed to the billing identifier of host 14. It should be understood that the present invention contemplates any other billing rules or techniques to apportion communication charges to mobile units 12, hosts 14, and remotes 22.

Figure 2:
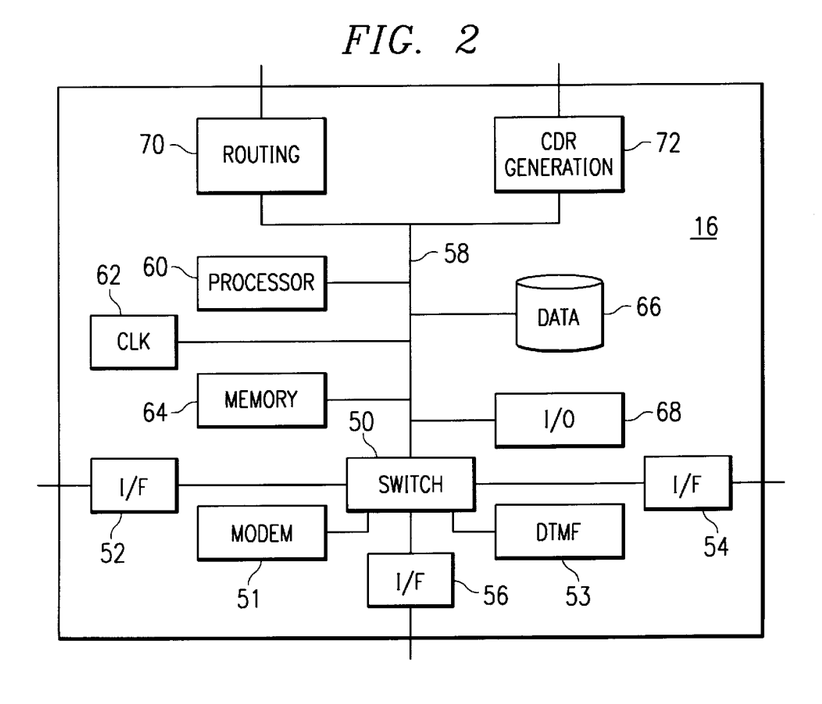
FIG. 2 illustrates in more detail the complex of the communication system.

FIG. 2 illustrates in more detail complex 16 of communication system 10. A switch 50 is coupled to communication facilities 18, 20, and 24 using interfaces 52, 54, and 56, respectively. One or more modems 51 and dual-tone multifrequency (DTMF) encoders/decoders 53 are coupled to switch 50. Modem 51 and DTMF 53 operate to encode and decode data communicated between complex 16 and mobile units 12, hosts 14, or remotes 22. In particular, modem 51 and DTMF 53 provide a data interface between switch 50 and a bus 58.

A processor 60 is coupled to switch 50 using bus 58. A real-time clock 62 is also coupled to bus 50. A memory 64, coupled to bus 58, contains programs and instructions executable by processor 60 to control the operation of complex 16. Database 66, coupled to bus 58, stores data to be routed by complex 16, as well as any other data accessible by processor 60 to control the operation of complex 16. Information stored in database 66, profile database 26, and CDR database 28 may be stored in database 66, external to complex 16, or in any other suitable storage facility. Databases 26, 28, and 66 and memory 64 may include random access memory (RAM), read only memory (ROM), CD-ROM, or any other suitable volatile or non-volatile memory. Input/output module 68 provides local or remote access to complex 16 to allow maintenance, management and control of complex 16, modification of user profile and billing information, troubleshooting, and other activities.

Also coupled to bus 58 is routing module 70 and CDR generation module 72. Routing module 70 is coupled to profile database 26 and operates to control the routing of voice and data in communication system 10. CDR generation module 72 is coupled to CDR database 28 and operates to generate voice and data billing information for a call detail record that represents a call transaction processed by complex 16. In one embodiment, CDR generation module 72 may also access profile database 26 to perform its functions. Routing module 70 and CDR generation module 72 are shown separate from processor 60 and memory 64, but it should be understood that these modules may be integral to or separate from other components of complex 16.

In operation, complex 16 communicates with mobile units 12, hosts 14, and remotes 22 using interfaces 52, 54, and 56, respectively. For voice communication, mobile unit 12 may initiate a call which is received at interface 52 of complex 16. Switch 50 may receive call routing data, such as the identity of the called party, using modem 51, DTMF 53, or any suitable signaling technique supported by communication system 10. If the call is directed to remote 22, switch 50 directs interface 56 to establish a connection to remote 22 by, for example, dialing a telephone number. Switch 50 then couples the call received from mobile unit 14 and the call placed to user 22 to provide voice communication.

If the call is directed to host 14, switch 50 may access profile database 26 using routing module 70 to determine the appropriate connection information for host 14. Using this information, switch 50 directs interface 54 to establish communication with the selected host 14. Switch 50 then couples the calls to provide voice communication between mobile unit 12 and host 14. Therefore, complex 16 may operate to directly switch calls using a provided telephone number, or may access profile database 26 for connection information of users in communication system 10. This allows calls to be made to and from mobile unit 12, host 14, and remote 22 by specifying a telephone number or any other appropriate identifier recognized by complex 16 and associated with stored connection information.

For data communication, complex 16 may receive data from host 14 at interface 54. The data is decoded using modem 51, DTMF 53, or any other suitable demodulation technique and passed to bus 58 for storage in database 66. Routing module 70 then accesses profile information in profile database 26 that corresponds to host 14, the originator of the data communication. Routing module 70 accesses a data association for host 14 to determine the recipients of the data, and may generate a timestamp and a delivery priority for the data. At appropriate times determined by processor 60 or routing module 70, complex 16 retrieves the data from database 66, passes the data to switch 50, and transmits the data to the appropriate recipients using interfaces 52, 54, and 56. In one embodiment, switch 50 establishes communication with mobile unit 12 using interface 52 to transfer all data entries in database 66 for delivery to mobile unit 12. This store-and-forward technique for data communication by complex 16 provides efficient use of communication time to minimize cost. This may be particularly important for communications to and from mobile unit 12 using costly air time of a mobile communication network, such as a cellular telephone network.

During the routing of voice and data communication in complex 16, CDR generation module 72 monitors this activity on bus 58 and generates voice and data billing information to be included in a CDR for each call transaction. Clock 62 provides the start and stop time for each voice or data segment in the call transaction, which may be captured by CDR generation module 72 to construct the CDR. CDR generation module 72 or billing system 30 then applies billing rules to apportion the communication costs to the appropriate billing identifiers. A call transaction may be any communication link between complex 16 and a user (mobile unit 12, host 14, remote 22) of communication system 10. In addition, a call transaction may be an end-toend communication link between two users of communication system 10 that is routed through complex 16.

Figure 3:
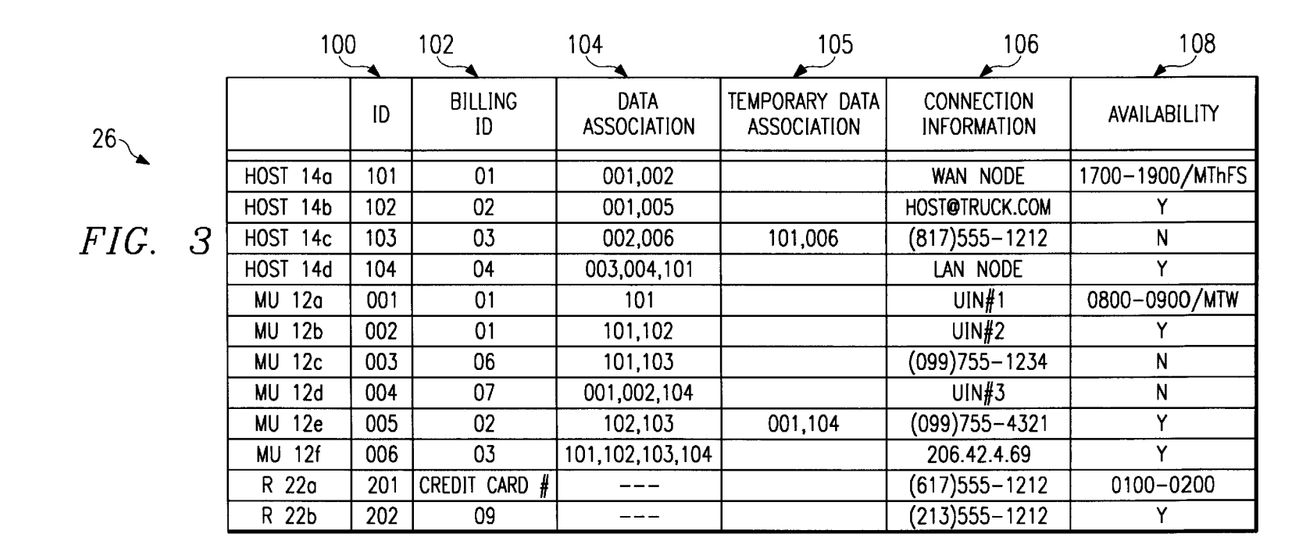
FIG. 3 illustrates profile information for mobile units, hosts, and remotes in the communication system.

FIG. 3 illustrates the contents of profile database 26 that provide both routing and billing functions to users of communication system 10. Profile database 26 includes an entry for each mobile unit 12, each host 14, and at least some remotes 22 of communication system 10. Each entry in profile database 26 includes an identifier 100, a billing identifier 102, a data association 104, a temporary data association 105, connection information 106, and an availability indication 108.

Identifier 100 identifies each user of communication system 10. Identifiers 100 selected for mobile units 12, hosts 14, and remotes 22 may correspond to a particular numbering scheme. Billing identifier 102 indicates the billing responsibility of each user in communication system 10. In this example, hosts 14a–14d, mobile units 12c–12d, and remote 22b are associated with separate billing identifiers 102. However, communications chargeable to mobile units 12a and 12b are billed to host 14a (billing identifier=01), communications chargeable to mobile unit 12e are billed to host 14b (billing identifier=02); and communications chargeable to mobile unit 12f are billed to host 14c (billing identifier=03). A user's billing identifier 102 may also be a credit card number, debit card number, or other account identifier, as indicated by billing identifier 102 associated with remote 22a.

Data association 104 allows complex 16 to route data to the appropriate locations based on the identity of the data originator. Data association 104 for each entry in profile database 26 includes one or more identifiers 100 of users in communication system 10. For example, data association 104 for host 14d includes three identifiers (003, 004, 101) associated with mobile unit 12c, mobile unit 12d, and host 14a. Therefore, data received at complex 16 from host 14d would be automatically routed to mobile unit 12c, mobile unit 12d and host 14a as a default. In a similar fashion, data association 104 for mobile unit 12f includes four identifiers (101, 102, 103, 104) associated with hosts 14a–14d. Therefore, data originating from mobile unit 12f may be automatically routed to hosts 14a–14d. In this manner, data association 104 for each entry in profile database 26 17 provides a default routing function for each data originator.

In a default or unaddressed mode, complex 16 retrieves data association 104 stored in profile database 26 to route the data. However, if a data originator desires to send data to users that are different from those specified in data association 104, a data originator may communicate a temporary data association 105 to be stored in profile database 26. Temporary data association 105 replaces or overrides data association 104 for one or more specific communications to accomplish an addressing function.

As shown in FIG. 3, complex 16 received and stored a temporary data association 105 communicated by mobile unit 12e. This temporary data association 105 overrides data association 104 and causes complex 16 to route data originating from mobile unit 12e to mobile unit 12a (identifier=001) and host 14d (identifier=104). Temporary data association 105 may apply to one or more blocks of data transmitted by mobile unit 12e. After the addressed data has been sent, complex 16 removes temporary data association 105 and reverts back to data association 104. Temporary data association 105 may be received from users in communication system 10, stored, and removed as needed by complex 16 to accomplish both unaddressed and addressed data routing, as described below in more detail with reference to FIG. 7.

Connection information 106 to establish a call transaction between users in communication system 10 may include a telephone number, an electronic mail address, local area network (LAN) or wide area network (WAN) address or node information, a transfer control protocol or Internet protocol (TCP/IP) address, a uniform resource locator (URL), a user identification number (UIN), or any other appropriate information to establish connection with the specified user using any network or communication facility. Connection information 106 may be accessed by switch 50 to direct interfaces 52, 54, and 56 to make the appropriate connections to users of communication system 10. It should be understood that a call transaction as used in this description embodies without limitation any communication session established using connection information 106, whether data only, voice only, or both data and voice.

Availability indication 108 indicates whether hosts 14, mobile units 12, and remotes 22 are currently available for communication, the time these users may be available for communication, or the times these users are scheduled for communication. For example, availability indication 108 may be a flag indicating availability, or may include information indicating an availability period for the user (time of day, day of week, etc.). Referring to FIG. 3, host 14c is not available ("N"), whereas mobile unit 12a will be available between 8:00AM and 9:00AM on Monday, Tuesday, and Wednesday. Availability indication 108 may be set by the complex 16 or in response to a communication from a user of communication system 10 indicating its availability. Complex 16 consults availability indications 108 to schedule communication with users of communication system 10.

Figure 4:
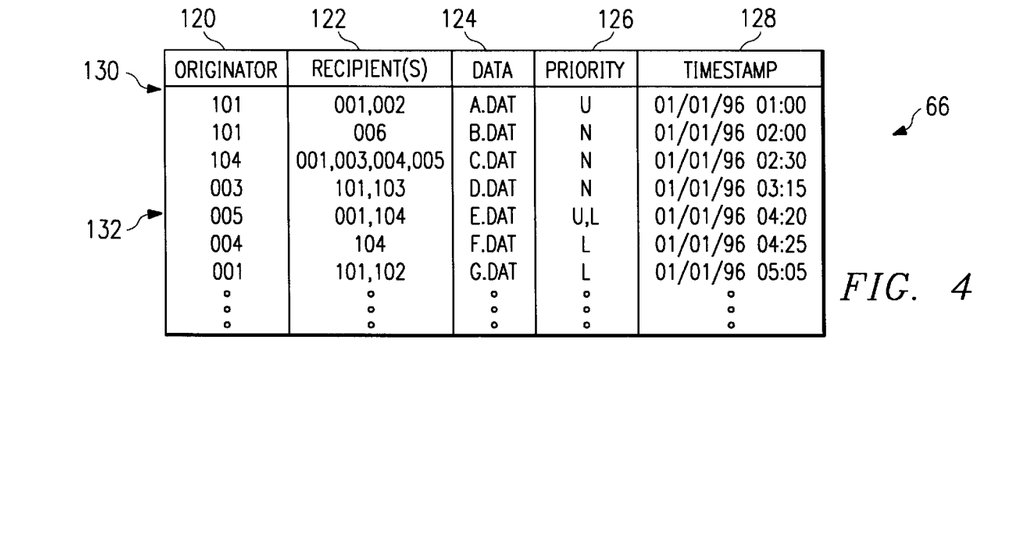
FIG. 4 illustrates stored data to be sent by the complex.

FIG. 4 illustrates the contents of database 66 in complex 16. Each entry in database 66 represents data stored in complex 16 for delivery to one or more recipients. Each entry includes an originator identifier 120, one or more recipient identifiers 122, data 124, a delivery priority 126, and a timestamp 128. Originator identifier 120 corresponds to identifier 100 stored in profile database 26. Recipient identifiers 122 correspond to identifiers 100 in data association 104 or temporary data association 105 stored in profile database 26. Data 124 corresponds to any information communicated between users of communication system 10. For example, data 124 may include status information of mobile units 12 which includes location information, engine performance information, load information, routing and arrival information, dispatcher or broker instructions, personal messages, or any other information that relates to the operation of mobile unit 12, the user of mobile unit 12, and the associated function performed by the user of mobile unit 12.

Entry 130 corresponds to data 124 (A.DAT) received from host 14a (originator identifier=101) for delivery to mobile units 12a and 12b (recipient identifiers=001, 002). This represents the default or unaddressed mode since mobile units 12a and 12b are specified in data association 104 for host 14a stored in profile database 26. Entry 132 corresponds to data 124 (E.DAT) received from mobile unit 12e (originator identifier =005) for delivery to mobile unit 12a (recipient identifier =001) and host 14d (recipient identifier=104). This represents the addressed mode since mobile unit 12a and host 14d are specified in temporary data association 105 for mobile unit 12e stored in profile database 26.

Delivery priority 126 may be low, normal, urgent, or any other designation that specifies the time sensitivity of the data to be delivered. For example, a low priority designation (L) indicates that complex 16 need only deliver the data during off-peak hours to reduce communication charges. A normal priority designation (N) indicates that complex 16 may deliver the data at any time that contact is made with the recipient. An urgent priority designation (U) indicates that complex 16 should immediately contact the recipient to deliver the data. As shown in entry 132, different delivery priorities 126 (U, L) may be specified for different recipient identifiers 122 (001, 104). Timestamp 128 provides the date and time that complex 16 receives data 124 from originator 120. This information may be used by complex 16 to prioritize and schedule delivery of data to recipients.

Figure 5:
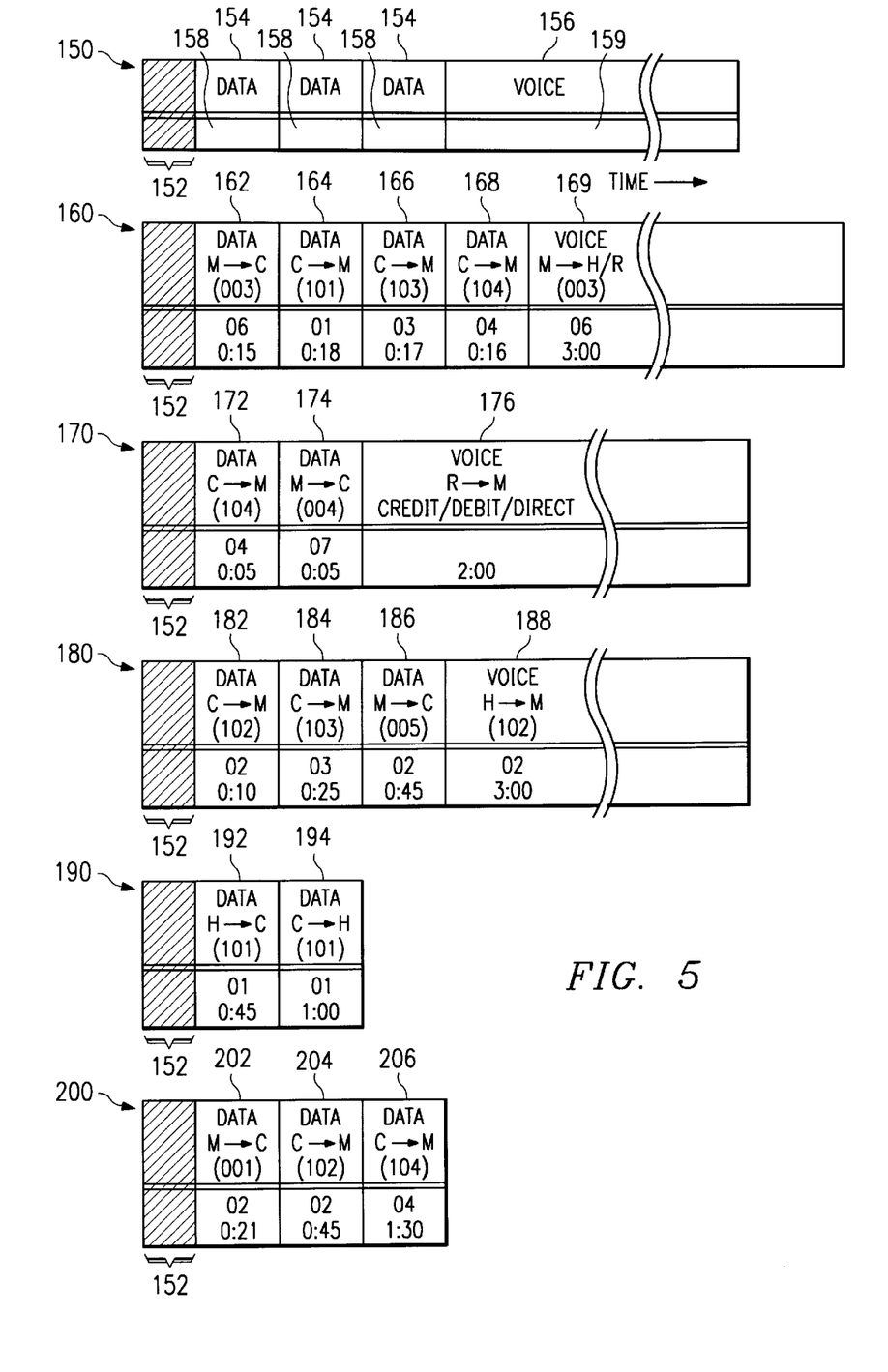
FIG. 5 illustrates exemplary call transactions and associated billing information.

FIG. 5 illustrates exemplary call transactions and associated billing information that may be generated by CDR generation module 72 and stored in CDR database 28. Call transaction 150 represents components of a single call transaction between complex 16 and a user of communication system 10. Upon establishing communication, a handshake period 152 allows users of communication system 10 to verify their identity to prevent communication fraud, such as cellular telephone fraud. U.S. patent application Ser. No. 08/175,256 entitled "Data Messaging in a Communications Network" discloses a method and apparatus for preventing cellular telephone fraud, and is hereby incorporated by reference.

Call transaction 150 includes one or more data segments 154 that represent an exchange of data between complex 16 and the user. For example, a first data segment 154 may represent communication of data from mobile unit 12 to complex 16, a second data segment 154 may represent communication of data originated by host 14a from complex 16 to mobile unit 12, and a third data segment 154 may represent communication of data originated by host 14b from complex 16 to mobile unit 12. A voice segment 156 that precedes or follows data segments 154 represents voice communication between two users in communication system 10.

Before or after termination of call transaction 150, CDR generation module 72 or billing system 30 generates data billing information 158 and voice billing information 159 that can be later used to bill different entities for use of certain data and voice segments of call transaction 150. Billing information may include billing identifier 102, billable time, called number, calling number, date, day, time of day, and any other suitable billing information associated with call transaction 150. Those portions relating to call transaction 150 actually stored in CDR database 28 and used by billing system 30 may include segments 154 and 156, billing information 158 and 159, or any appropriate combination of segments 154 and 156 and billing information 158 and 159.

Call transaction 160 corresponds to a voice/data call from mobile unit 12. Like call transaction 150, call transaction 160 begins with handshake period 152 followed by four data segments 162, 164, 166, and 168 and ending with a voice segment 169. Data segment 162 represents a fifteen second communication from mobile unit 12c (identifier=003) to complex 16 which is billed to mobile unit 12c (billing identifier =06). Data segment 164 corresponds to an eighteen second communication from complex 16 to mobile unit 12c of data originating from host 14a (identifier=101), which is billed to host 14a (billing identifier=01). Data segment 166 corresponds to a seventeen second communication from complex 16 to mobile unit 12c of data originating from another host 14c (identifier=103) which is to be billed to host 14c (billing identifier=03). Data segment 168 corresponds to communication from complex 16 to mobile unit 12c of data from yet another host 14d. Therefore, data segments 162, 164, 166, and 168 in call transaction 160 represent communication of data from mobile unit 12c to complex 16, as well as communication of data originating from hosts 14a, 14c, and 14d to mobile unit 12c.

Voice segment 169 corresponds to a voice communication, originated by mobile unit 12c, with another user in communication system 10. Since complex 16 couples calls between users of communication system 10, complex 16 can monitor voice segment 169 and generate appropriate billing information. In this example, complex 16 assesses the charges of voice segment 169 to mobile unit 12c (identifier =003, billing identifier=06) as the call originator.

The generation of billing information illustrated below the double line in call transaction 160 may be performed by CDR generation module 72 or billing system 30. This is performed by applying the appropriate billing rules and accessing profile database 26 to determine the appropriate billing identifier 102 for each voice and data segment in call transaction 160. Also, any appropriate rounding, truncation, or modification of communication time may be performed by CDR generation module 72 or billing system 30 to generate a billable time. The present invention contemplates any appropriate use of voice and data segment information to generate billing identifiers 102, billable time, and other billing information for apportioning communication costs to users of communication system 10.

Call transaction 170 corresponds to a voice call initiated by remote 22a to mobile unit 12d. After handshake period 152 and before providing voice communication, complex 16 and mobile unit 12d exchange data in data segments 172 and 174. Data segment 172 corresponds to a five second communication from complex 16 to mobile unit 12d of data originating from host 14d (identifier=104, billing identifier= 04). Data segment 174 corresponds to another five second communication from mobile unit 12d to complex 16 of data originating from mobile unit 12d (identifier=004, billing identifier=07). After data segments 172 and 174, complex 16 patches the call from remote 22a to mobile unit 12d to provide voice communication. Remote 22a as the call originator is billed for the two minute voice communication. Remote 22a may be billed by automatic credit card charging, by establishment of a funded account and use of debit card, by the generation and transmittal of a direct bill to remote 22a, or by any other suitable technique.

Call transaction 180 corresponds to a voice call initiated at host 14b to mobile unit 12e. After handshake period 152, complex 16 and mobile unit 12e exchange data in data segments 182, 184, and 186. Data segments 182 and 184 represent communication of data originally from hosts 14b and 14c to mobile unit 12e. Data segment 186 represents communication of data from mobile unit 12c to complex 16. After data segments 182, 184, and 186, complex 16 patches the voice call from host 14b to mobile unit 12e, and this three minute call is charged to host 14b, the call originator.

Call transaction 190 corresponds to data communication between host 14a and complex 16. In this example, complex 16 assesses all communication charges to host 14a. Data segment 192 corresponds to data communication from host 14a to complex 16, and data segment 194 corresponds to data communication from complex 16 to host 14a.

Call transaction 200 represents a special call transaction in which mobile unit 12 responds to an immediate data request from host 14b. Instead of charging data segment 202 to mobile unit 14a as the data originator, complex 16 assesses communication charges for a response to an immediate data request to host 14b (billing identifier=02), the data requester. Data segments 204 and 206 correspond to data communication from complex 16 to mobile unit 12a of data originating from hosts 14b and 14d.

Throughout the description of call transactions in FIG. 5, it should be understood that the billable time recorded for each segment may reflect the actual communication time for the data or voice communication, or may be a rounded, truncated, or otherwise modified value. For example, communication facilities or providers may desire to bill usage in full minute or fractional minute increments. Therefore, CDR generation module 72 or billing system 30 may record the actual communication time of a segment in a call transaction, but modify this time to satisfy billing constraints and desires. Furthermore, other considerations such as day of the week, time of day, mileage between users, and other factors other than billable time may be considered and included in CDRs to apportion charges in communication system 10.

Figure 6:
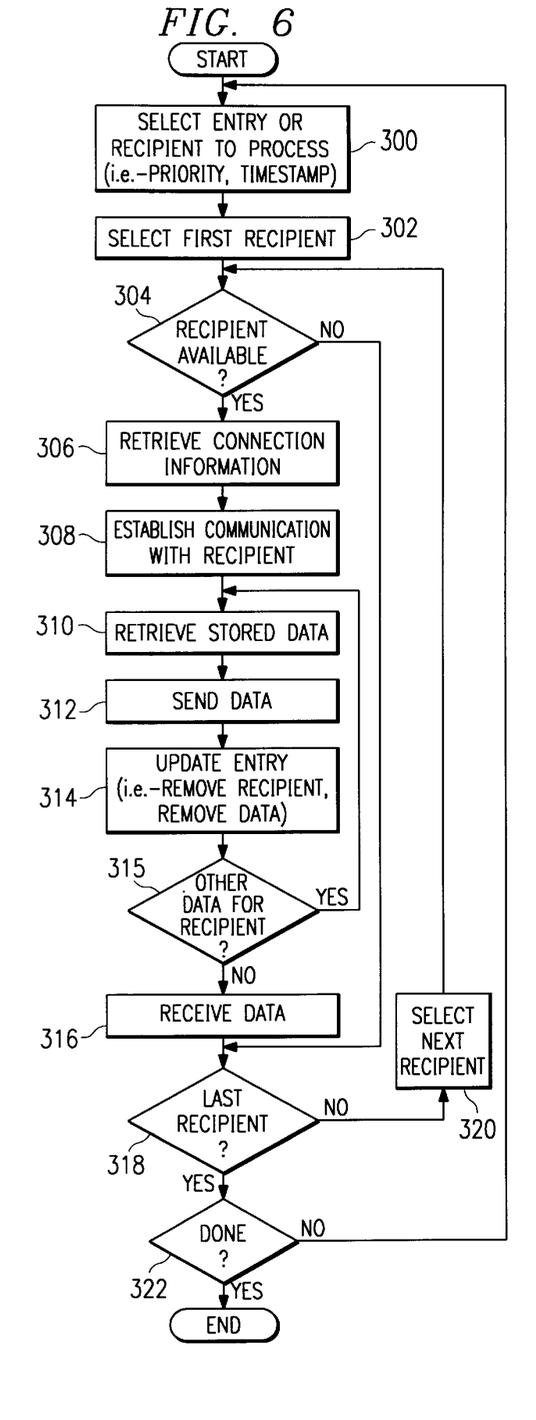
FIG. 6 is a flowchart of a method for sending data performed at the complex.

FIG. 6 is a flow chart of a method for sending data performed at complex 16. The method begins at step 300 where complex 16 selects an entry in database 66 to process. Complex 16 may select the entry based on delivery priority 126, timestamp 128, or other appropriate considerations. Upon selecting the entry, complex 16 selects the first recipient indicated by recipient identifier 122 at step 302. As an alternative to steps 300 and 302, complex 16 may select a recipient based on a scheduled time indicated by availability indicator 108 stored in profile database 26, the delivery priority 126 of particular data 124 for delivery to the recipient, or other appropriate considerations. The method of FIG. 6 proceeds as if an entry in database 66 is selected to process, but an identical method may be initiated by selection of a particular recipient.

Complex 16 accesses profile database 26 to determine if the availability indicator 108 corresponding to the recipient indicates that the recipient is available at step 304. If the recipient is available at step 304, complex 16 retrieves connection information 106 corresponding to the recipient at step 306 and establishes communication with the recipient using connection information 106 at step 308. Complex 16 retrieves data 124 stored in database 66 at step 310 and sends the retrieved data 124 to the recipient using switch 50, interface 52, 54, or 56, and optionally modem 51 or DTMF 53. Complex 16 updates the entry in database 66 to reflect that data has been sent to the recipient at step 314. This may be accomplished by removing recipient identifier 122 corresponding to the recipient or, if all recipients have received the data for the selected entry, by removing the entire entry in database 66.

If complex 16 determines that data in other entries of database 66 are to be sent to the selected recipient at step 315, the method continues at step 310. This allows complex 16 to send in a single call transaction a portion or all of the data stored in database 66 associated with the selected recipient. Steps 310 through 315 repeat until complex 16 determines that there is no more data to send to the selected recipient. Moreover, any or all of steps 310, 314, and 315 may be performed before establishing communication with the selected recipient so as to decrease the processing and memory access times during a call transaction. For example, complex 16 may construct a package of data from multiple entries in database 66 before initiating a call transaction.

After sending data to the selected recipient, complex 16 may then receive data from the recipient while the communication link is still available at step 316, which is described in more detail below with reference to FIG. 7. By exchanging information between complex 16 and the recipient, communication system 10 provides an efficient and cost-effective technique to communicate data among its users while reducing the number of call transactions.

If the recipient is unavailable at step 304 or after complex 16 has received data, if any, from the recipient at step 316, complex 16 determines if this is the last recipient at step 318. If it is not the last recipient, complex 16 selects the next recipient at step 320 and returns to step 304. Complex 16 executes steps 304–316 for each recipient indicated in recipient identifiers 122 for the selected entry in database 66.

Upon encountering the last recipient in recipient identifiers 122 for the selected entry in database 66 at step 318, complex 16 determines if it is done sending data at step 322. If complex 322 is not done, the method returns to step 300, where complex 16 selects the next entry in database 66 to process. If complex 16 is done at step 322, the method of FIG. 6 ends.

Figure 7:
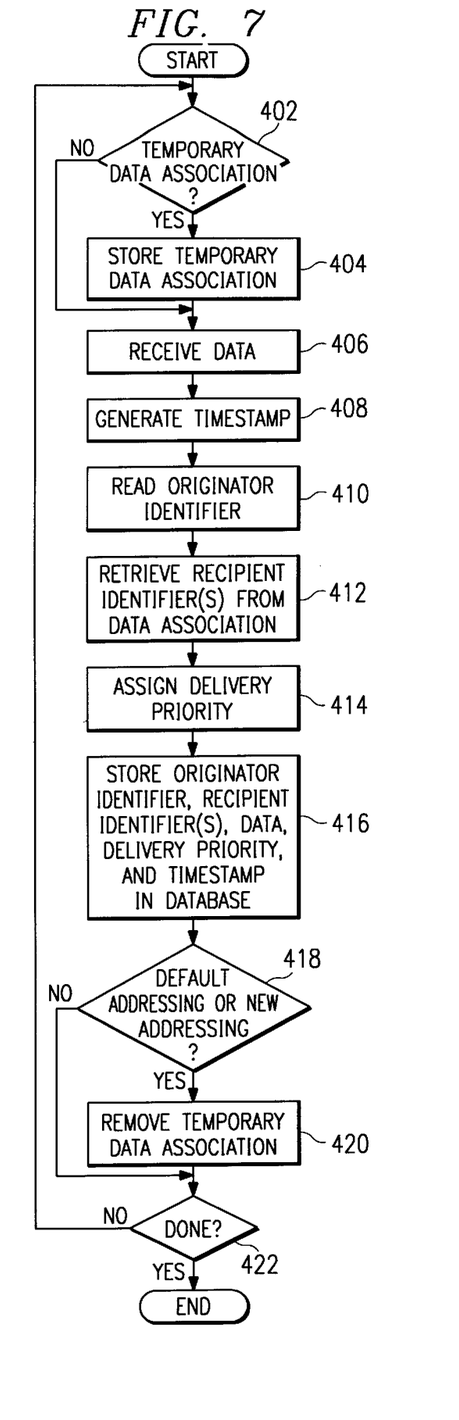
FIG. 7 is a flowchart of a method for receiving data performed at the complex.

FIG. 7 is a flow chart of a method for receiving data performed at complex 16. The method begins at step 402 where complex 16 determines if a temporary data association 105 associated with the data originator has been received. If a temporary data association 105 has been received, complex 16 stores temporary data association 105 in profile database 26 at step 404. The temporary data association 105 allows data originators to override the default routing specified in data association 104.

Complex 16 receives data 124 at step 406 and generates timestamp 128 using clock 62 at step 408. Complex 16 also reads originator identifier 120 associated with the data originator at step 410. Complex 16 retrieves recipient identifiers specified in data association 104 or temporary data association 105 corresponding to originator identifier 120 at step 412. In one embodiment, complex 16 first accesses temporary data association 105 to identify recipients and, if temporary data association 105 does not exist, complex 16 accesses data association 104 to identify recipients. Using any appropriate technique, complex 16 assigns delivery priority to one or more recipients at step 414. Complex 16 then stores originator identifier 120, recipient identifiers 122, data 124, delivery priority 126, and timestamp 128 as an entry in database 66 at step 416.

If data originator desires to revert back to default addressing using data association 104 or data originator desires to provide a new temporary data association 105, as determined at step 418, then temporary data association 105 is removed from profile database 26 at step 420. Alternatively, complex 16 may remove temporary data association 105 at step 420 each time a new entry is stored in database 66. If complex 16 is not done receiving data at step 422, the method returns to step 400 to receive more data. A single data reception session may include the reception and storage of one or more pieces of addressed or unaddressed data. For example, a data originator may send the following stream of information to complex 16 for delivery: (a) first data together with a first temporary data association 105 for routing to a first set of recipients, (b) second data together with a second temporary data association 105 for routing to a second set of recipients, and (c) third data without a temporary data association 105 for routing to a default set of recipients identified in data association 104.

Figure 8:
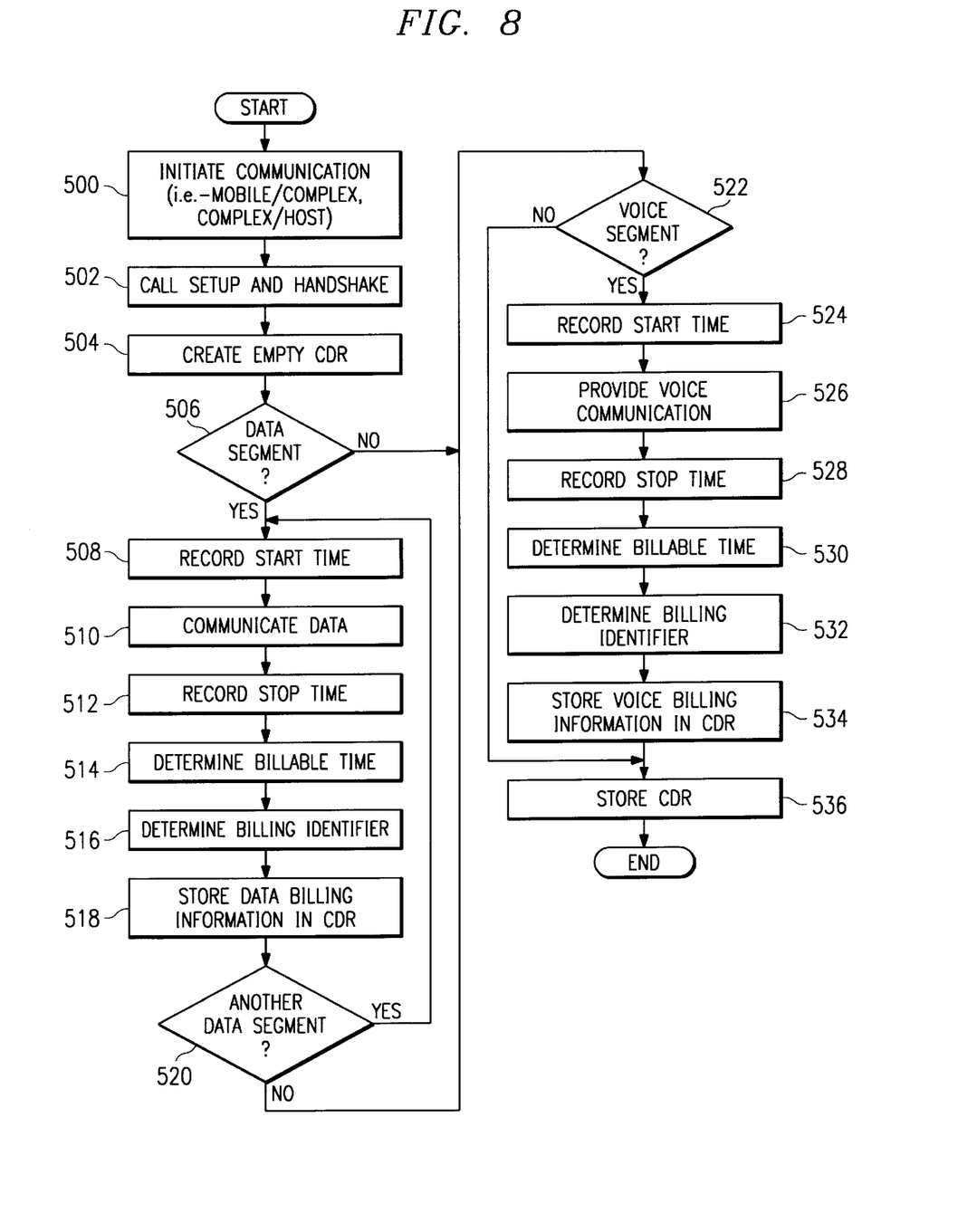
FIG. 8 is a flowchart of a method for generating a call detail record performed at the complex.

FIG. 8 is a flow chart of a method for generating a call detail record (CDR) performed at complex 16. The method is executed each time complex 16 communicates with a user of communication system 10. For example, steps 312 and 316 in FIG. 6, step 406 in FIG. 7, and any other suitable communication event to be charged may result in the generation of a CDR in accordance with the method of FIG. 8.

The method begins at step 500 where communication is established between complex 16 and a user of communication system 10. Call setup and handshake is performed at step 502 which corresponds to handshake period 152 in FIG. 5. Complex 16 creates an empty CDR at step 504. As described below, this CDR may be populated by segment information, billing information, or both segment information and billing information associated with data segments and voice segments of the call transaction.

If the call transaction includes a data segment at step 506, then complex 16 records the start time of the data segment at step 508. Complex 16 communicates data with the user at step 510 and records the stop time at step 512. Complex 16 determines billable time at step 514. If appropriate, complex 16 may round, truncate, or otherwise modify the communication time to correspond to the billing requirements and conventions in communication system 10.

Complex 16 determines a billing identifier for the data segment at step 516. An exemplary billing rule selects the billing identifier of the data originator. Variations on this rule may be implemented, such as billing all communications between hosts 14 and complex 16 to the billing identifier of hosts 14. It should be understood that any appropriate billing rules may be implemented by complex 16 to determine the billing identifier at step 516.

The billable time and billing identifier are stored as data billing information in the CDR at step 518. Other information may also be stored in the CDR, such as date, time of day, call distance, or other appropriate billing information that may be used to determine the charges for the data segment. If complex 16 receives another data segment at step 520, the method returns to step 508. Steps 508–518 are executed for each data segment in the call transaction.

If the call transaction does not include a data segment at step 506 or the last data segment has been processed at step 520, complex 16 determines if the call transaction includes a voice segment at step 522. If the call transaction includes a voice segment, complex 16 records the start time at step 524, provides voice communication at step 526, and records the stop time at step 528 upon termination of voice communication. Complex 16 determines the billable time at step 530 and determines the billing identifier at step 532 in a similar fashion as steps 514 and 516 described above. An exemplary billing rule apportions the cost of the voice segment to the billing identifier of the call originator. It should be understood that complex 16 may implement any appropriate billing rules to selectively apportion the cost of the voice segment in the call transaction.

Complex 16 stores the billable time, the billing identifier, and any other suitable voice billing information in the CDR at step 534. Complex 16 stores the CDR with billing information in CDR database 28 at step 536 for later processing by billing system 30. Alternatively, complex 16 may store only data segment information or voice segment information in CDR database 28, and billing system 30 later generates the billable time, the billing identifier, and any other suitable billing information based on this segment information. In this alternative embodiment, steps 514 and 530 for determining billable time and steps 516 and 532 for determining the billing identifier may be performed off-line at billing system 30 after the call transaction has been completed. This embodiment allows complex 16, using CDR generation module 72, to record and store segment information, while billing system 30 applies billing rules to generate the billing information.

Complex 16 may generate a CDR with any arrangement or ordering of one or more data segments with one or more voice segments. The generation of a single CDR that includes one or more data segments and one or more voice segments provides flexibility to allow billing system 30 to apportion charges to users of communication system 10. Furthermore, complex 16 supports billing identifiers 102 that allow a variety of groupings or associations of users in different operating environments.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A communication system, comprising:

an originator operable to send data;

a plurality of recipients operable to receive data; and a complex coupled to the originator and the recipients, the complex comprising a database operable to store a previously established data association that specifies a default routing function for the originator, a first billing identifier associated with the originator, and a plurality of second billing identifiers, each second billing identifier associated with a recipient, the complex operable to receive data from the originator and to store data for delivery to at least one of the recipients specified in the data association, the complex further operable to select one of the first billing identifier or a second billing identifier according to a predetermined billing rule, and to generate a call detail record having the selected billing identifier and a billable time relating to the time to receive data from the originator.

2. The system of claim 1, wherein the originator comprises a mobile unit equipped with a cellular telephone.

3. The system of claim 1, wherein the recipient comprises a host coupled to a landline telephone network.

4. The system of claim 1, wherein data received from the originator comprises status information and an identifier associated with the originator, wherein the complex retrieves the data association and the billing identifier using the identifier of the originator.

5. The system of claim 1, wherein the database is operable to store:

an identifier of the originator;

a previously established data association specifying a plurality of recipients based upon the identifier of the originator; and connection information to establish communication with the recipients.

6. The system of claim 1 wherein the data association comprises:

a data association that specifies a default routing to a first set of the recipients; and a temporary data association that specifies an override routing to a second set of the recipients different from the first set of the recipients.

7. The system of claim 6, wherein the originator is further operable to communicate the temporary data association to the complex.

8. The system of claim 6, wherein the complex sends data to the second set of the recipients specified in the temporary data association.

9. The system of claim 1, further comprising a memory operable to store:
data received from the originator;
an identifier of the originator;
a timestamp indicating the time the complex received data from the originator; and
a delivery priority for data received from the originator.

10. A method for communicating comprising the following steps performed at a complex:
receiving data from an originator;
retrieving a previously established recipient identifier associated with a default routing function for the originator;
storing data for delivery to a recipient indicated by the recipient identifier;
storing a first billing identifier associated with the originator;
storing a Plurality of second billing identifiers, each second billing identifier associated with a recipient;
selecting one of the first billing identifier or a second billing identifier according to a predetermined billing rule; and
generating a call detail record having a billable time relating to the time to receive the data from the originator and the selected billing identifier.

11. The method of claim 10, further comprising the step of receiving a data association from the originator, the data association specifying a recipient identifier that overrides the previously established recipient identifier.

12. The method of claim 11, wherein the step of receiving the data association is performed before receiving data from the originator.

13. The method of claim 10, further comprising the step of assigning a delivery priority to data received from the originator.

14. The method of claim 10, further comprising:
retrieving an availability indicator associated with the recipient;
establishing communication with the recipient using connection information associated with the recipient if the availability indicator indicates that the recipient is available for communication; and
sending data to the recipient.

15. The method of claim 10, wherein the recipient comprises a first recipient and a second recipient, and further comprising:
retrieving a first availability indicator associated with the first recipient;
establishing communication with the first recipient using first connection information associated with the first recipient if the first availability indicator indicates that the first recipient is available for communication;
sending data to the first recipient;
retrieving a second availability indicator associated with the second recipient;
establishing communication with the second recipient using second connection information associated with the second recipient if the second availability indicator indicates that the second recipient is available for communication; and
sending data to the second recipient.

16. The method of claim 14, further comprising the step of receiving data from the recipient after sending data to the recipient.

17. A communication system, comprising:
a plurality of originators operable to send data;
a recipient operable to receive data; and
a complex coupled to the originators and the recipient, the complex comprising a database operable to store a previously established data association that defines a default routing function for each of the originators, the complex operable to receive data from the originators, the complex further operable to retrieve the data association for each originator to identify the recipient, the complex further operable to send data received from the originators to the recipient in a call transaction;
wherein the complex is further operable to store a plurality of first billing identifiers, each first billing identifier associated with an originator, and a second billing identifier associated with the recipient, to select one of a first billing identifier or the second billing identifier according to a predetermined billing rule, and to generate a call detail record for the call transaction, the call detail record comprising a plurality of data segments associated with the originators, each data segment specifying a billable time to communicate data received from an associated originator and the selected billing identifier.

18. The system of claim 17, wherein each originator comprises a host coupled to a landline telephone network.

19. The system of claim 17, wherein the recipient comprises a mobile unit equipped with a cellular telephone.

20. The system of claim 17, wherein the database is operable to store connection information to establish communication with the recipient.

21. The system of claim 17, wherein the data association of at least one originator comprises:
a data association that specifies a default routing to a first recipient; and
a temporary data association that specifies an override routing to a second recipient different from the first recipient.

22. The system of claim 21, wherein the complex sends data to the second recipient specified in the temporary data association.

23. The system of claim 17, further comprising a memory operable to store:
data received from the originators;
a timestamp indicating the time the complex received data from the originators; and
a delivery priority for data received from the originators.

24. The system of claim 17, wherein the complex is further operable to generate a call detail record for the call transaction, the call detail record comprising a plurality of data segments associated with the originators.

25. A method for communicating comprising the following steps performed at a complex:
receiving data from a plurality of originators;
retrieving a previously established recipient identifier associated with a default routing function for each of the originators;
storing data for delivery to a recipient indicated by the recipient identifier; and
communicating data received from the originators to the recipient in a call transaction;
storing a plurality of first billing identifiers, each first billing identifier associated with the originator;
storing a second billing identifier associated with the recipient;

selecting one of a first billing identifier or the second billing identifier according to a predetermined billing rule; and generating a call detail record for the call transaction, the call detail record comprising a plurality of data segments associated with the originators, each data segment specifying a billable time to communicate data received from an associated originator and the selected billing identifier.

26. The method of claim 25, further comprising the step of generating a call detail record for the call transaction, the call detail record comprising a plurality of data segments associated with the originators.

27. The method of claim 25, further comprising the step of receiving a data association from at least one originator, the data association specifying a recipient identifier that overrides the previously established recipient identifier.

28. The method of claim 25, further comprising the step of assigning a delivery priority to data received from at least one originator.

29. The method of claim 25, further comprising:

retrieving an availability indicator associated with the recipient; and establishing communication with the recipient using connection information associated with the recipient if the availability indicator indicates that the recipient is available for communication.

30. The method of claim 29, further comprising the step of receiving data from the recipient after sending data to the recipient.

31. A method for generating a call detail record, comprising:

establishing a call between a first of a plurality of users and a complex;

communicating data between the first user and the complex during a data segment of the call;

storing a first billing identifier in the call detail record relating to the data segment;

providing voice communication to the first user through the complex during a voice segment of the call; and storing a second billing identifier in the call detail record relating to the voice segment;

wherein the first billing identifier is associated with one of the first user and a second user different from the first user and the second billing identifier is associated with the other of the first user and the second user.

32. The method of claim 31, wherein the step of establishing a call comprises performing a handshake protocol between the first user and the complex.

33. The method of claim 31, wherein the first user is a mobile unit equipped with a cellular telephone and the second user is a host coupled to a landline telephone network.

34. The method of claim 31, further comprising:

storing a billable time in the call detail record relating to the data segment, the billable time relating to the time to communicate data between the first user and the complex.

35. The method of claim 31, further comprising storing a billable time in the call detail record relating to the voice segment, the billable time relating to the time provided for voice communication.

36. The method of claim 31, further comprising the step of generating a bill in response to the call detail record.

37. A method for generating a call detail record, comprising:

establishing a call between a first of a plurality of users and a complex;

communicating first data between the first user and the complex during a first data segment of the call;

storing a first billing identifier in the call detail record relating to the first data segment;

communicating second data between the first user and the complex during a second data segment of the call; and storing a second billing identifier in the call detail record relating to the second data segments;

wherein the first billing identifier is associated with one of the first user and a second user different from the first user and the second billing identifier is associated with the other of the first user and the second user.

38. The method of claim 37, wherein the first user is a mobile unit equipped with a cellular telephone and the second user is a host coupled to a landline telephone network.

39. The method of claim 37, further comprising:

providing voice communication to the first user through the complex during a voice segment of the call; and storing a third billing identifier in the call detail record relating to the voice segment, the third billing identifier associated with one of the first user, the second user, or a third user.

40. The method of claim 39, further comprising:

storing a billable time in the call detail record relating to the time provided for voice communication, the billable time relating to the time provided for voice communication.

41. The method of claim 37, wherein the step of establishing a call comprises performing a handshake protocol between the first user and the complex.

42. The method of claim 37, further comprising the step of generating a bill in response to the call detail record.

* * * * *